United States Patent
Augustoni et al.

(10) Patent No.: US 9,356,553 B2
(45) Date of Patent: *May 31, 2016

(54) STRING CONTINUITY MONITORING

(71) Applicants: Gerald Augustoni, Puyloubier (FR); Tudor Lipan, Ottawa (CA); Raymond Kenneth Orr, Kanata (CA)

(72) Inventors: Gerald Augustoni, Puyloubier (FR); Tudor Lipan, Ottawa (CA); Raymond Kenneth Orr, Kanata (CA)

(73) Assignee: Solantro Semiconductor Corp., Ottawa (CA)

(*) Notice: Subject to any disclaimer, the term of this patent is extended or adjusted under 35 U.S.C. 154(b) by 401 days.

This patent is subject to a terminal disclaimer.

(21) Appl. No.: 14/073,473

(22) Filed: Nov. 6, 2013

(65) Prior Publication Data

US 2014/0265603 A1 Sep. 18, 2014

Related U.S. Application Data

(63) Continuation-in-part of application No. 13/840,162, filed on Mar. 15, 2013.

(51) Int. Cl.
*H02J 1/00* (2006.01)
*G01R 31/40* (2014.01)
*H02J 3/38* (2006.01)

(52) U.S. Cl.
CPC . *H02S 50/00* (2013.01); *H02J 1/00* (2013.01); *H02J 3/383* (2013.01); *Y02E 10/563* (2013.01); *Y10T 307/696* (2015.04)

(58) Field of Classification Search
CPC .......................................................... H02J 1/00
USPC .......................................................... 307/140
See application file for complete search history.

(56) References Cited

U.S. PATENT DOCUMENTS

2014/0265638 A1* 9/2014 Orr .................. H01L 31/02021
307/131

* cited by examiner

*Primary Examiner* — Robert Deberadinis
(74) *Attorney, Agent, or Firm* — Rahman LLC

(57) ABSTRACT

A system and method of monitoring a photovoltaic (PV) installation includes providing a string of multiple panel interface device enabled PV panels; operatively connecting an inverter to the string; operatively connecting at least one PV panel to the string; discharging an input capacitance of the inverter; comparing a current in the string to a predetermined current threshold value; and controlling connection of the at least one PV panel to the string based on the comparing of the current in the string to the predetermined current threshold value. A panel interface device may be used to discharge the input capacitance of the inverter.

21 Claims, 10 Drawing Sheets

STRING CONTINUITY MONITORING

CROSS-REFERENCE TO RELATED APPLICATIONS

This application is a continuation-in-part of U.S. patent application Ser. No. 13/840,162 filed on Mar. 15, 2013, the complete disclosure of which, in its entirety, is hereby incorporated by reference.

BACKGROUND

1. Technical Field

The embodiments herein generally relate to photovoltaic (PV) solar panels, and more particularly to techniques to ensure safe interaction with PV solar panels.

2. Description of the Related Art

PV solar panels are an important source of electrical power. Large, megawatt arrays with PV panels numbering in the tens of thousands are increasingly common. A typical PV panel is organized as a series connection of individual PV cells. A common configuration is 72 PV cells per panel. A typical PV cell operating voltage under full illumination is approximately 0.7 V. An illuminated PV panel with 72 direct current (DC) PV cells will therefore have an output voltage of approximately 50 volts DC. PV panels are typically connected in series to form a panel "string". In a DC PV panel system, the output of the PV panel string could connect to a central inverter which converts the DC power of the PV panels into AC power suitable for the electrical grid. Typically, there are between five and twenty PV panels in a panel string producing a combined voltage of several hundred volts.

PV panels produce power whenever they are illuminated. As described above, the voltages on a string could reach hazardous levels of hundreds of volts. These voltages could be a safety hazard during PV panel installation and maintenance. If the PV panels are mounted to a roof or integrated into building structures, these voltages can also represent a hazard during emergency operations such as fire fighting since the PV panels will continue to generate voltage even when the PV installation is disconnected from the electrical grid. Accordingly, there remains a need for a technique to allow for safer interaction with PV solar panels.

SUMMARY

In view of the foregoing, an embodiment herein provides a method of monitoring a PV installation, the method comprising providing at least one PV panel reconnected to a power system after a previous disconnection, wherein the power system does not draw current from the at least one PV panel; determining whether a maintain connection condition is satisfied to maintain connection of the at least one PV panel to the power system; and controlling the connection of the at least one PV panel to the power system based on whether the maintain connection condition is satisfied. The controlling the connection of the at least one PV panel to the power system may comprise automatically resuming the connection of the at least one PV panel to the power system responsive to determining that the maintain connection condition is satisfied. The controlling the connection of the at least one PV panel to the power system may comprise automatically disconnecting the at least one PV panel from the power system responsive to determining that the maintain connection condition is not satisfied. The maintain connection condition may comprise determining whether there is a minimum magnitude of a negative current in the power system. The negative current may comprise a discharge current of an inverter input capacitance, and wherein the determining whether the maintain connection condition is satisfied comprises determining whether there is at least a minimum magnitude of current flow in the power system. The method may further comprise toggling at least one switch that is operatively connected to the at least one PV panel to control an amplitude of the negative current. The method may further comprise providing a string of PV panels; and using a panel interface device (PID) to operatively disconnect the at least one PV panel from the string.

Another embodiment provides a method of monitoring a PV installation, the method comprising providing a string of multiple panel interface device (PID) enabled PV panels; operatively connecting an inverter to the string; operatively connecting at least one PV panel to the string; discharging an input capacitance of the inverter; comparing a current in the string to a predetermined current threshold value; and controlling connection of the at least one PV panel to the string based on the comparing of the current in the string to the predetermined current threshold value. The method may further comprise using a PID to discharge the input capacitance of the inverter. The method may further comprise waiting for a predetermined period of time prior to the discharging of the input capacitance. The method may further comprise checking for a negative DC current in the string during the waiting process. The method may further comprise immediately maintaining connection of the at least one PV panel to the string when the negative DC current in the string is detected during the waiting process. The method may further comprise maintaining connection of the at least one PV panel to the string when the current in the string is less than the predetermined current threshold value. The method may further comprise disconnecting the at least one PV panel to the string when the current in the string is greater than or equal to the predetermined current threshold value. The method may further comprise toggling at least one switch that is operatively connected to the at least one PV panel to control a rise of the current.

Another embodiment provides a PV system comprising at least one PV panel; a power system operatively connected to the at least one PV panel, wherein the power system does not draw current from the at least one PV panel; at least one switch that controls maintaining connection of the at least one PV panel to the power system; and a controller operatively connected to the at least one switch, wherein the controller determines whether a maintain connection condition is satisfied to maintain connection of the at least one PV panel to a power system, and supplies switch drive signals to the at least one switch for the maintaining connection of the at least one PV panel to the power system based on whether the maintain connection condition is satisfied. The controller may supply the switch drive signals to the at least one switch to automatically resume the connection of the at least one PV panel to the power system responsive to determining that the maintain connection condition is satisfied. The controller may supply the switch drive signals to the at least one switch to automatically disconnect the at least one PV panel from the power system responsive to determining that the maintain connection condition is not satisfied. The PV system may further comprise a current sensor operatively connected to the controller, wherein the maintain connection condition comprises using the current sensor to determine whether there is a minimum magnitude of a negative current in the power system. The PV system may further comprise a PID operatively connected to the at least one PV panel; and an inverter operatively connected to the PID, wherein the negative current comprises a discharge current of an input capacitance of the inverter, and wherein the current sensor determines whether there is at least a minimum magnitude of current flow in the power system. The controller may toggle the at least one switch to control an amplitude of the negative current.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1A:
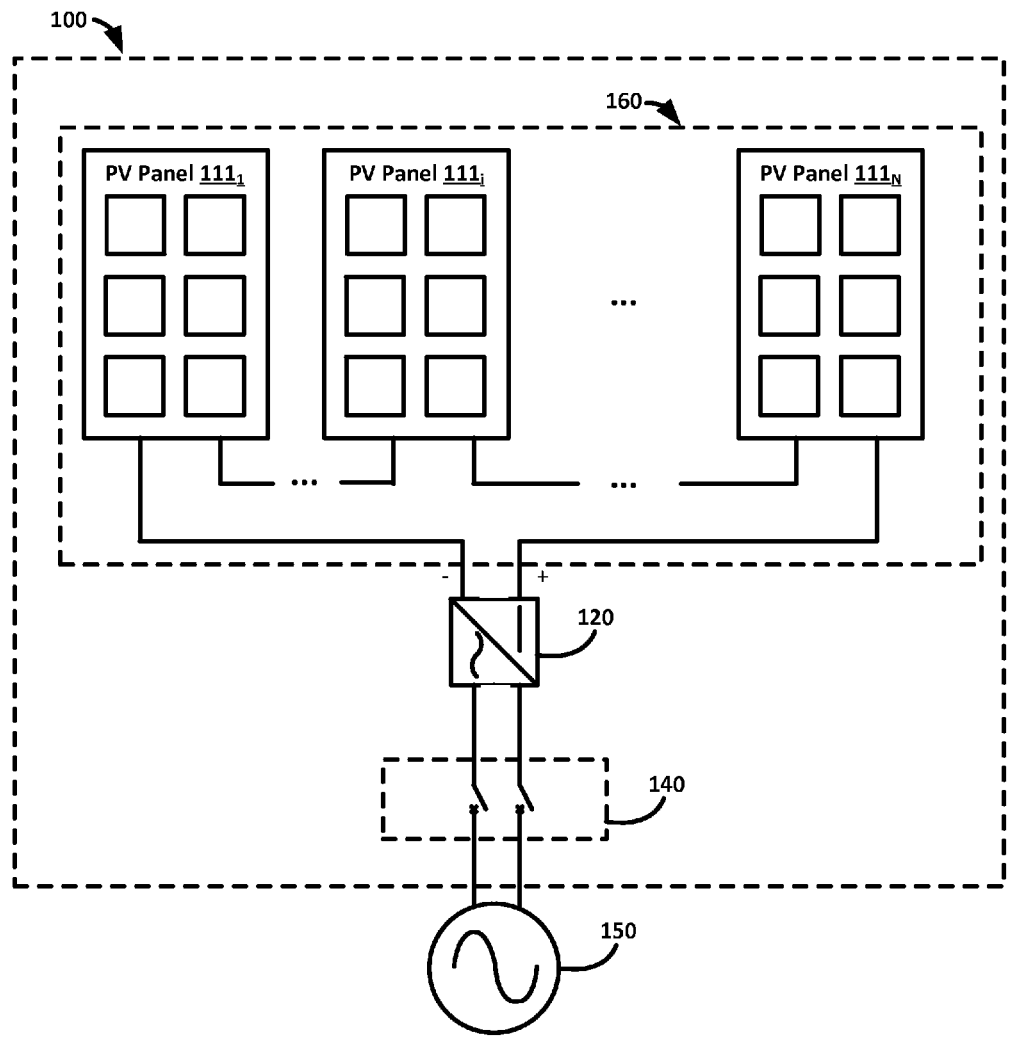
FIG. 1A is a block diagram of an example grid tied PV installation.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a technique for safer interaction with PV solar panels. Referring now to the drawings, and more particularly to FIGS. 1A through 6, where similar reference characters denote corresponding features consistently throughout the figures, there are shown preferred embodiments.

FIG. 1A is a block diagram of an example grid tied PV installation 100. The example installation 100 includes panel "string" 160 operatively connected to the input of inverter 120 (e.g., a power inverter, etc.). String 160 comprises a series connection of PV panels $111_1, \ldots 111_N$. The output of inverter 120 operatively connects to electrical grid 150 through grid disconnect switch 140. FIG. 1A is an example only and other arrangements are possible in accordance with the embodiments herein.

Figure 1B:
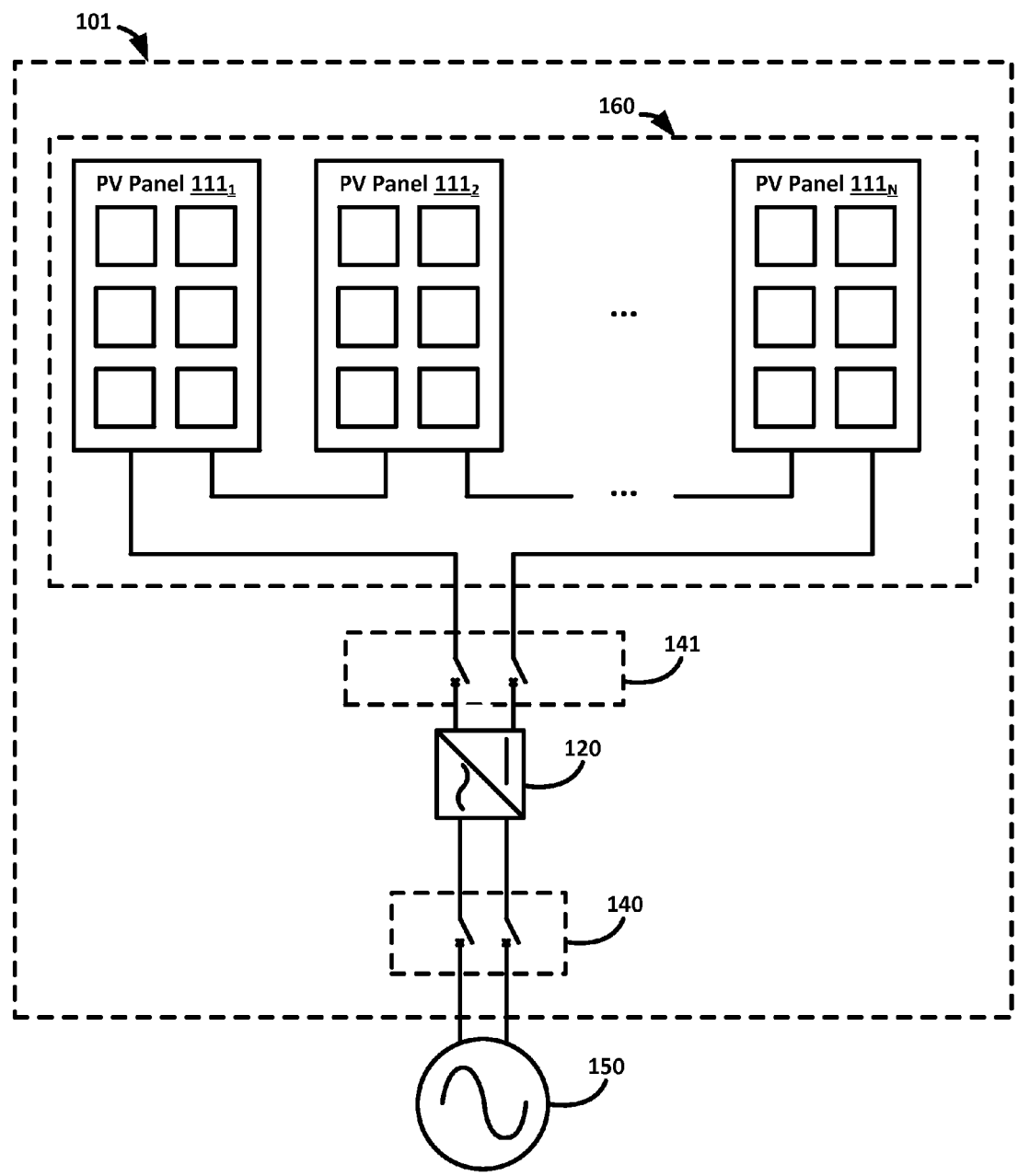
FIG. 1B is a block diagram of another example grid tied PV installation.

FIG. 1B, with respect to FIG. 1A, is a block diagram of another example grid tied PV installation 101. In example installation 101, there is an additional disconnect switch 141 between string 160 and the input of inverter 120. In other embodiments additional disconnect means may be used between the string 160 and the inverter 120 and/or between the inverter 120 and the grid 150, including fuses for example. Additional disconnect means may provide for easier maintenance of the inverter 120.

Again, power production by PV panels under illumination can represent a potential safety hazard. It could therefore be useful to have the PV panels in a PV installation isolate themselves from their string and not output power whenever the PV installation is disconnected from the grid.

A PV installation could disconnect from the grid for any of a number of reasons. These could include a manual disconnect for maintenance purposes and/or during an emergency such as a fire. Also, a PV installation could instead automatically disconnect due to an electrical fault on the grid. A PV installation could also be disconnected from the grid prior to its commissioning.

It could be useful if PV panels isolated themselves from their string in the event of an open circuit condition in their string. This might be caused by, for example: a physical break in the string; removal of one or more PV panels from the string for maintenance, repair, or replacement; disconnection of the string from an inverter for inverter repair or replacement by opening of a disconnect switch; a fault in the inverter; and/or during initial PV panel installation before all PV panels are installed in a string.

Figure 2A:
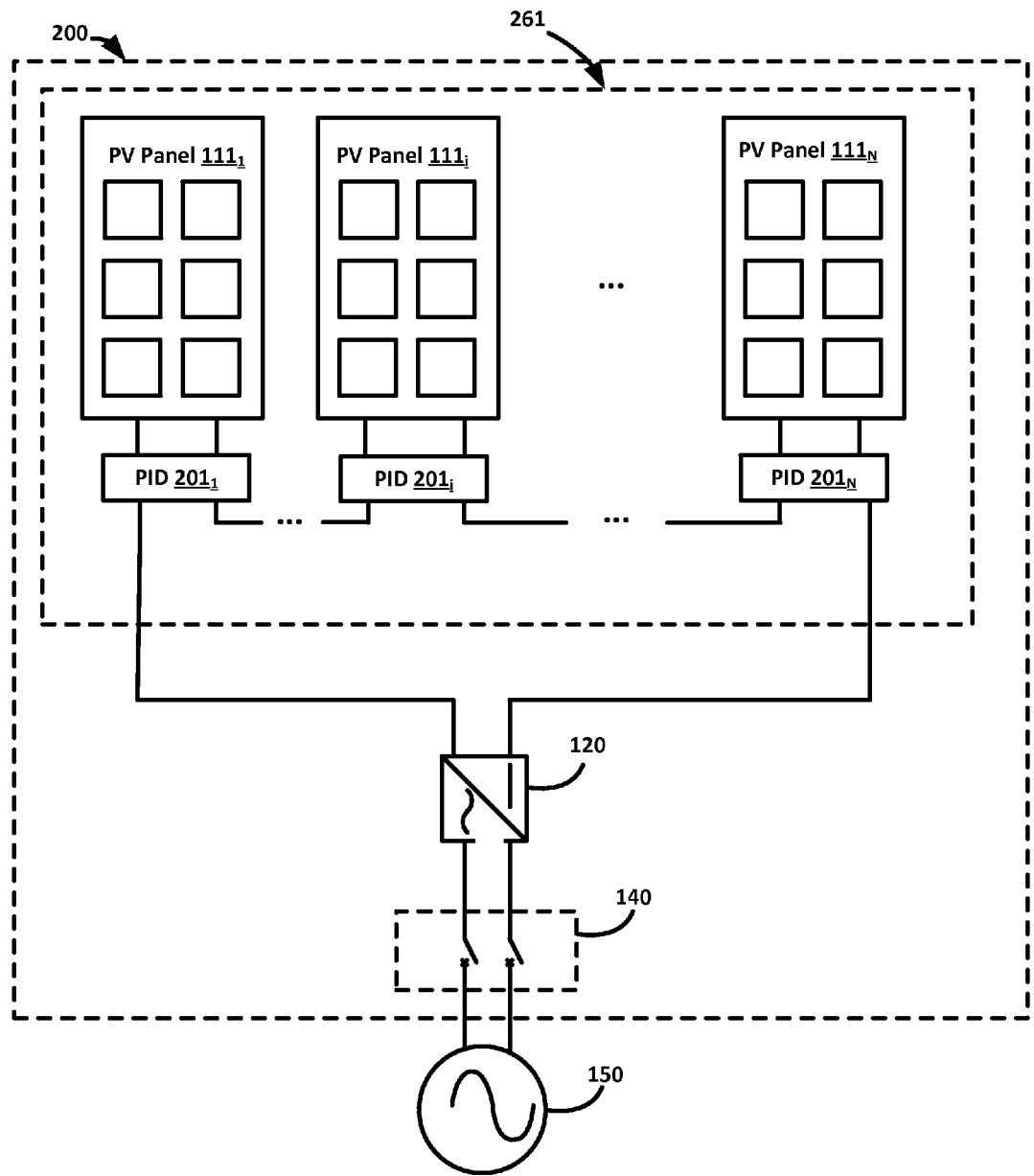
FIG. 2A is a block diagram of a further example grid tied PV installation according to an embodiment herein.

FIG. 2A, with reference to FIGS. 1A and 1B, is a block diagram of another example grid tied PV installation 200 according to an embodiment herein. PV installation 200 comprises string 261 and inverter 120. String 261 comprises PV panels $111_1, \ldots 111_N$ and panel interface devices (PIDs) $201_1, \ldots 201_N$. The DC outputs of PV panels $111_1, \ldots 111_N$ respectively and operatively connect to the inputs of PIDs $201_1, \ldots 201_N$. PIDs $201_1, \ldots 201_N$ perform a safety disconnect function and disconnect their respective PV panels $111_1, \ldots 111_N$ (where i can be in the range for 1 to N) from the string in the event of an open circuit or high resistance condition on the string. In one embodiment PIDs $201_1 \ldots 201_N$ monitor the current in string 261 and disconnect their respective PV panels $111_1 \ldots 111_N$ when the string current drops below a predetermined threshold value.

An open circuit condition could be caused by, for example, removal of one or more PV panels $111_1, \ldots 111_N$, a physical break in the string 261, the opening of a switch (not shown) in the string 261, the blowing of a string fuse (not shown) and/or a fault in inverter 120.

A high resistance condition could be caused by inverter 120 ceasing operation. Inverter 120 could cease operation due to, for example, manual disconnection of the PV installation 200 from electrical grid 150 and/or anti-islanding of inverter 120. Anti-islanding refers to the automatic disconnection of a PV installation 200 from the grid 150 when the PV installation 200 detects that the main grid generator (not shown) is no longer present. Anti-islanding prevents the creation of "power islands" on parts of the grid 150 during a power failure. If the example PV installation 200 disconnects from grid 150 by, for example, opening of grid disconnect switch 140, then the input of inverter 120 will become high resistance and the string current will fall substantially to zero.

Figure 2B:
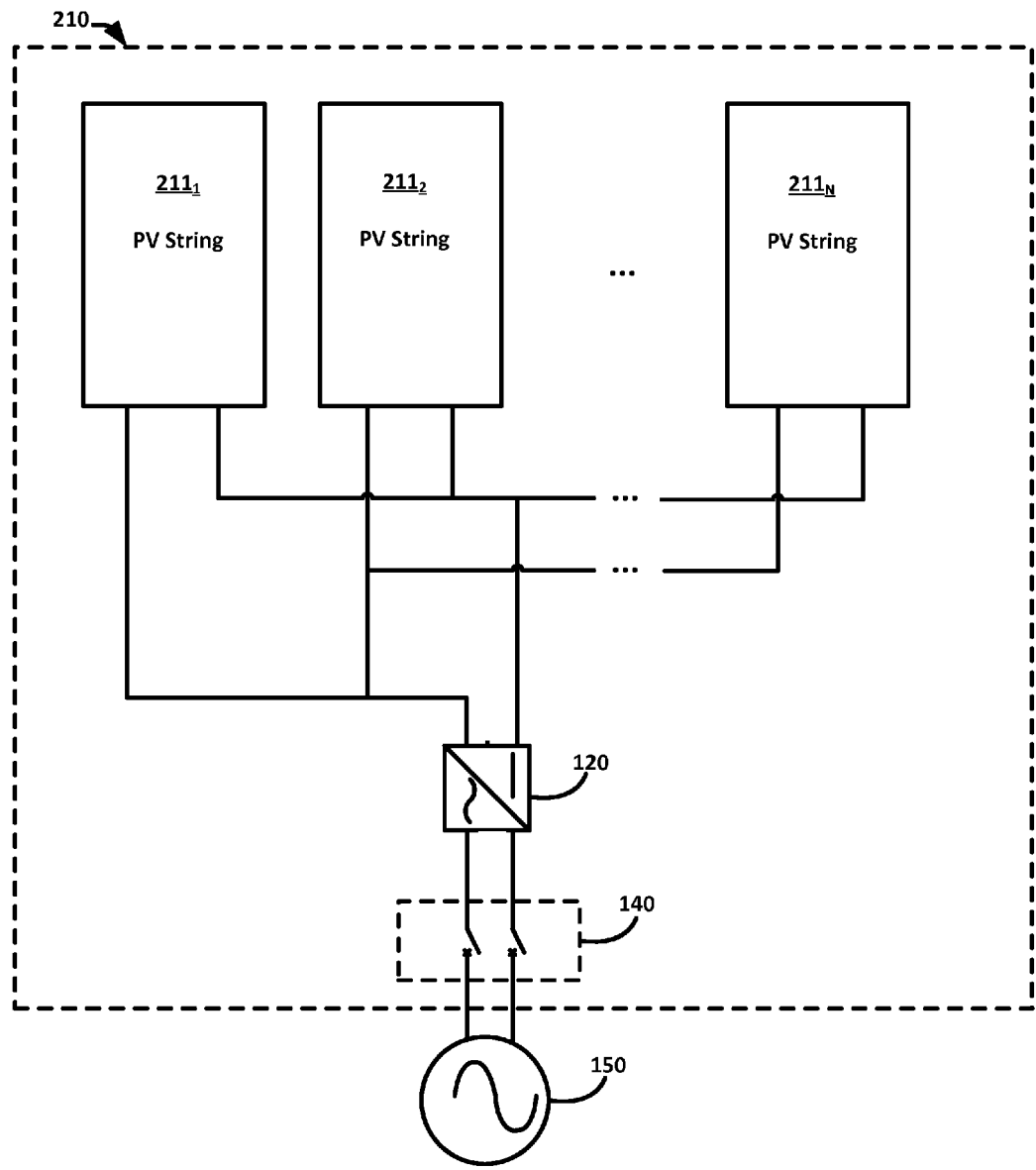
FIG. 2B is a block diagram of another example grid tied PV installation according to an embodiment herein.

FIG. 2B, with reference to FIGS. 1A through 2A, is a block diagram of another example grid tied PV installation 210 according to an embodiment herein. In this example installation 210, PV panel strings $211_1$, $211_2$, ... $211_N$ are connected in parallel to the inputs of inverter 120. Each PV panel string $211_1$, $211_2$, ... $211_N$ includes a string of PV panels with respective PIDs as shown in FIG. 2A for example. The example shown in FIG. 2A includes only one PV panel string 261, and the example shown in FIG. 2B includes multiple PV panel strings $211_1$, $211_2$, ... $211_N$.

Figure 3A:
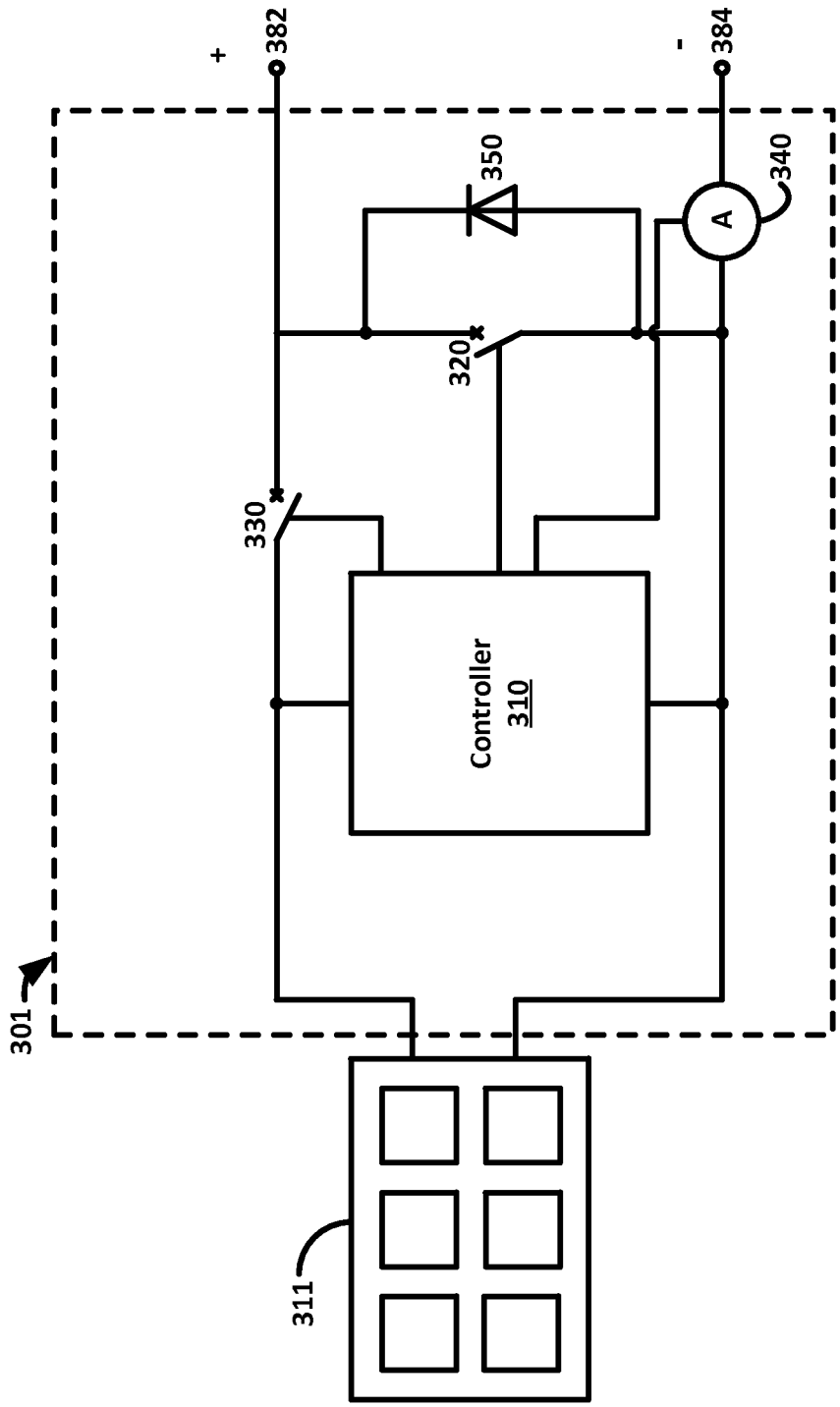
FIG. 3A is a block diagram of one embodiment of a panel interface device (PID) according to an embodiment herein.

FIG. 3A, with reference to FIGS. 1A through 2B, is a block diagram of one embodiment of a PID 301 according to an embodiment herein. PID 301 comprises controller 310, shunt switch 320, series switch 330, current sensor 340, diode 350, and output terminals 382, 384. The input of PID 301 operatively connects to PV panel 311. PID output terminals 382, 384 operatively connect to the PV panel string (not shown in FIG. 3A).

Switches 320, 330 could be implemented using any of a variety of means, including but not limited to: power Metal Oxide Semiconductor Field Effect Transistors (MOSFETs), Insulated Gate Bipolar Transistors (IGBTs), Thyristors, and/or relays, for example. Diode 350 is connected in parallel with switch 320. Diode 350 allows string current to flow in the event that PV panel 311 cannot supply sufficient power to operate controller 310. PV panel 311 could be unable to power controller 310 if it was defective or heavily shaded, for example. In this situation controller 310 would be unable to supply drive voltage to switch 320 and keep it closed, however current can still flow through diode 350 to bypass the panel 311. Under conditions where the controller 310 has sufficient power to drive the switch 320, the closed switch dissipates less power than the diode 350.

Current sensor 340 monitors the string current. Controller 310 draws its power from PV panel 311 and receives a current measurement from current sensor 340. Controller 310 controls the operation of switches 320, 330.

In normal operation, with PV panel 311 illuminated and producing a DC voltage, the shunt switch 320 is open and series switch 330 is closed. PV panel 311 is in series with the other panels in the panel string (not shown in FIG. 3A) and contributes to the string voltage and current.

Figure 3B:
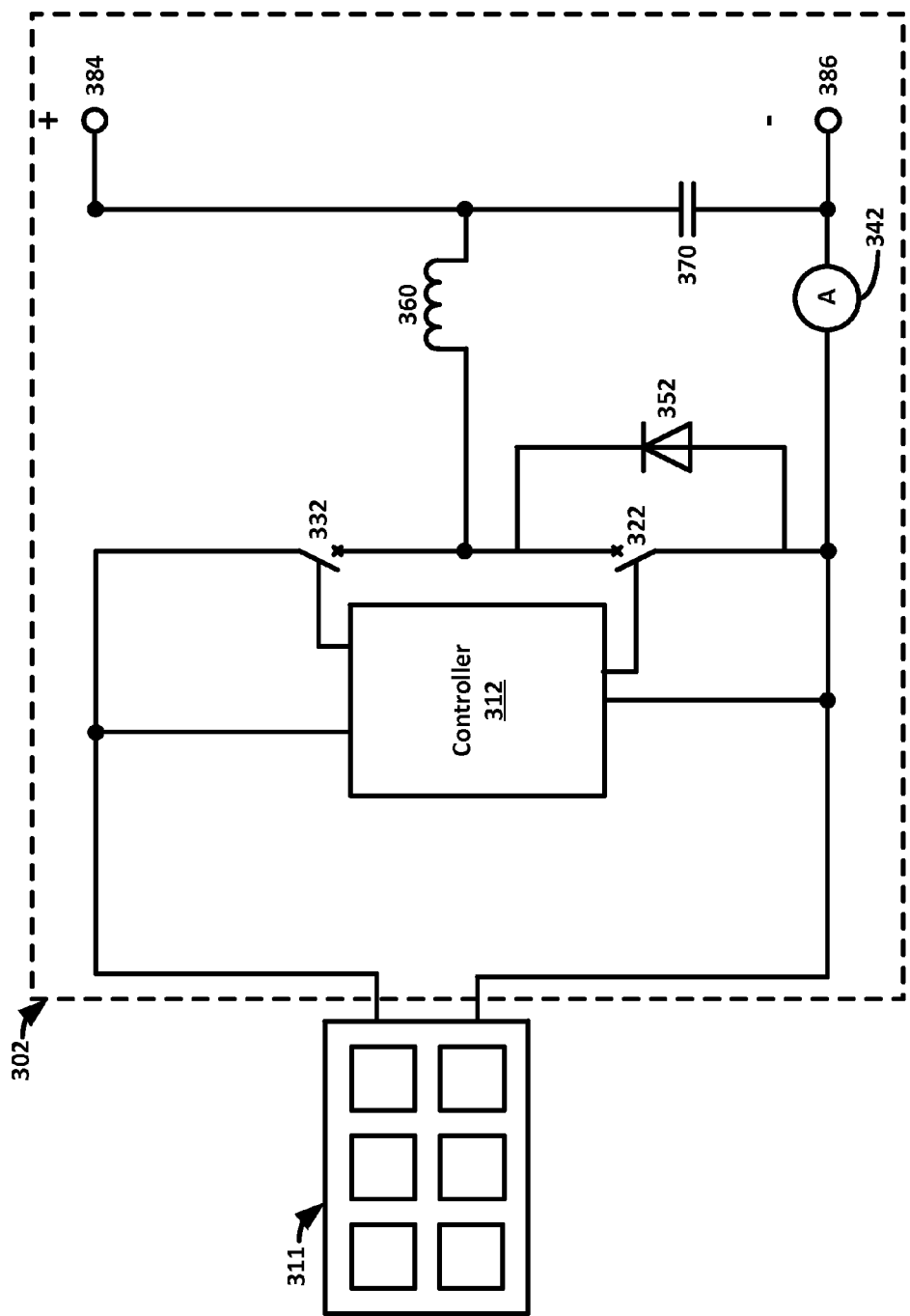
FIG. 3B is a block diagram of another example embodiment of a panel interface device (PID) according to an embodiment herein.

FIG. 3B, with reference to FIGS. 1A through 3A, is a block diagram of another embodiment of a PID 302 according to an embodiment herein. PID 302 incorporates DC power optimizer functionality in addition to safety disconnect functionality. A DC power optimizer uses a DC to DC converter to maximize the energy output of a PV panel 311. A DC power optimizer also matches its current output to the string current. Although such terms as optimizer, optimize, maximize, and the like are used herein, these terms are not intended to infer absolute optimality or maxima. For instance, power optimization functionality may improve performance, but might not necessarily achieve theoretical maximum or optimal power production or output.

PID 302, in the example shown in FIG. 3B, comprises controller 312, switches 322, 332, inductor 360, capacitor 370, current sensor 342, diode 352, and output terminals 384, 386. The input of PID 302 operatively connects to PV panel 311. Output terminals 382, 384 operatively connect to the PV panel string (not shown in FIG. 3B).

PID 302 is of a "buck" type DC to DC converter design and converts a DC input voltage at one level to a DC output voltage at another, lower level. Other types of DC to DC converter topologies are possible in accordance with the embodiments herein.

When PV panel 311 is illuminated and there is string current flowing, PID 302 performs a voltage conversion and power optimization operation. The operation is controlled by controller 312. Switches 322, 332 are switched with a frequency "f" and operate in a complementary fashion, such that when one switch is open (ON) the other switch will be closed (OFF).

When switch 332 is closed and switch 322 is open, current from PV panel 311 flows into inductor 360, storing energy therein. When switch 332 is opened and switch 322 is closed, the voltage across the inductor 360 reverses and it sources current into output capacitor 370 and the string. The duty cycle "D" of PID 302 is defined as the ratio of the ON time of switch 332 to the switching period T and is normally expressed as a percentage. The duty cycle could range from 0 to 100%. For example, if switch 332 is ON for 70% of the switching period then the duty cycle is 70%. The relationship of output voltage ($V_{OUT}$) of PID 302 to its input voltage ($V_{IN}$) depends on the duty cycle and is given by the equation:

$$V_{OUT} = DV_{IN}$$

$V_{OUT}$ is defined as the voltage across terminals 384, 386 and $V_{IN}$ is defined as the voltage of PV panel 311. The relationship of the output current ($I_{OUT}$) of PID 302 to its input current ($I_{IN}$) also depends on the duty cycle and is given by the equation:

$$I_{OUT} = \frac{I_{IN}}{D}$$

Switches 320, 330 could be implemented using any of a variety of means, including but not limited to: power Metal Oxide Semiconductor Field Effect Transistors (MOSFETs), Insulated Gate Bipolar Transistors (IGBTs), Thyristors, and/or relays, for example. Diode 352 is in parallel with switch 320. Diode 352 allows string current to flow in the event that PV panel 311 cannot supply sufficient power to operate controller 310 and keep switch 322 closed.

Disconnect Operations

Referring to FIG. 2A, in the event of an open circuit or high resistance condition in string 261, PIDs $201_1$, $201_i$, ... $201_N$ disconnect their respective PV panels $111_1$, $111_i$, ... $111_N$ from the string. PIDs $201_1$, $201_i$, ... $201_N$ could also disconnect their respective PV panels $111_1$, $111_i$, ... $111_N$ from string 261 in the event of an arc fault in the string 261. An arc fault is large and undesired current flow between a PV string and ground or between different conductors in the string and may occur when the insulation of the string wiring or string connectors fails or when the string is severed. Arc faults can lead to electrification of the PV panel mounting system, serious damage to equipment, fire, and/or injuries to personnel.

An open circuit or high resistance condition in a PV panel string results in the loss or substantial reduction in string current. In PID 301 of FIG. 3A, a loss or reduction in string current is detected by controller 310 using current sensor 340. In one embodiment, a string current of less than 200 mA triggers a disconnect of the PV panel 311. Here, controller 310 opens series switch 330, disconnecting PV panel 311 from the string (not shown in FIG. 3A). With series switch 330 open, maintenance and emergency workers are safely protected from the output of PV panel 311. Controller 310 could also close shunt switch 320, thereby maintaining the electrical continuity of the string at the point of connection of PID 301 to the string. In another embodiment controller 310 could keep switch 320 open. This could prevent damage to PID 301 in the event that it were to reconnect to an inverter with a fully charged input. In another embodiment switch 320 could be kept open and an auxiliary switch (not shown) in parallel with switch 320 is held closed and maintains the electrical continuity of the string. The auxiliary switch could have a sufficiently large "ON" resistance to prevent damage to PID 301 in the event that it were to reconnect to an inverter with a fully charged input. In one embodiment its "ON" resistance is approximately 10 ohms.

In another embodiment, controller 310 monitors current sensor 340 for the presence of an arc fault in the string. On detection of an arc fault, controller 310 disconnects PV panel 311 from the string by opening series switch 330. With switch 330 open, the PV panel 311 is disconnected from the PID 301, and the output voltage of the PV panel 311 does not contribute to the arc fault.

Arc fault detection could be in accordance with any of various known techniques. Some arc fault detection methods involve spectral analysis of the string current or voltage for a characteristic arc "signature". In one embodiment, controller 310 contains a Digital Signal Processor (DSP) (not shown) to facilitate the spectral analysis of the string current sensed by current sensor 340.

In PID 302 of FIG. 3B, the loss or reduction in string current from an open circuit or high resistance condition in the string (not shown in FIG. 3B) is detected by controller 312 using current sensor 342. In one embodiment, a string current of less than 200 mA triggers a disconnect of the PV panel 311. Here, controller 312 disconnects panel 311 from the string by holding switch 332 open. Accordingly, with switch 332 held open, PV panel 311 is disconnected from the string.

Controller 312 could also close shunt switch 322, thereby maintaining the electrical continuity of the string at the point of connection of PID 302 to the string. In another embodiment controller 312 could keep switch 322 open. This could prevent damage to PID 302 in the event that it were to reconnect to an inverter with a fully charged input. In another embodiment switch 322 could be kept open and an auxiliary switch (not shown) in parallel with switch 322 is held closed and maintains the electrical continuity of the string. The auxiliary switch could have a sufficiently large "ON" resistance to prevent damage to PID 302 in the event that it were to reconnect to an inverter with a fully charged input. In one embodiment the "ON" resistance is approximately 10 ohms.

In another embodiment, controller 312 monitors current sensor 342 for the presence of an arc fault in the string. On detection of an arc fault, controller 312 disconnects PV panel 311 from the string by opening switch 332. With switch 332 open, output voltage of the PV panel 311 does not contribute to the arc fault.

Reconnect Operations

After a PID has isolated its PV panels from the string, it could check to determine whether the disconnect condition has been resolved and whether its PV panel can be safely reconnected to the string. A variety of reconnect techniques are possible such as the ones described in U.S. patent application Ser. No. 13/840,162 entitled "INTELLIGENT SAFETY DISCONNECT SWITCHING" the complete disclosure of which, in its entirety, is herein incorporated by reference.

Reconnect

Again referring to FIG. 2A, after PID $201_i$ (where i can be in the range for 1 to N) has disconnected PV panel $111_i$ from string 261 due to, for example, a loss of string current or arc fault, etc., PID $201_i$ checks for the presence of inverter 120 connected to the string 261. In one embodiment, PID $201_i$ reconnects PV panel $111_i$ to string 261 when it senses the input capacitance of inverter 120. In this embodiment, PV panel $111_i$ is reconnected to string 261 even in the absence of a string current. The input capacitance of a PV string inverter 120 varies by manufacturer but is normally large and could be in the range of approximately 100 uF to 5 mF.

In many cases, after an inverter has stopped converting power it cannot immediately resume converting power. There is often a mandatory waiting period after the grid connection has been restored or the input voltage has returned to a valid operating value before the inverter can restart. The inverter cannot start operation and draw DC current from the string until this waiting period expires. The waiting period could be on the order of approximately five minutes in some embodiments. Therefore, after PID $201_i$ has reconnected its PV panel $111_i$ to string 261 it should remain connected to allow the inverter 120 sufficient time to start operation even if there is no string current flowing. After all PIDs $201_1, \ldots 201_N$ have reconnected their respective PV panels $111_1, \ldots 111_N$ to string 261 the string voltage at the input of the inverter 120 could be several hundred volts. If a break is created in the string 261 by, for example, someone removing a panel or disconnecting a cable, etc., serious injury could result. Accordingly, the embodiments herein provide a technique to monitor the continuity of a string (e.g., verify that a string is still physically continuous and connected to the inverter input) while waiting for the inverter to start, which substantially improves the safety of a PV panel array.

Figure 4A:
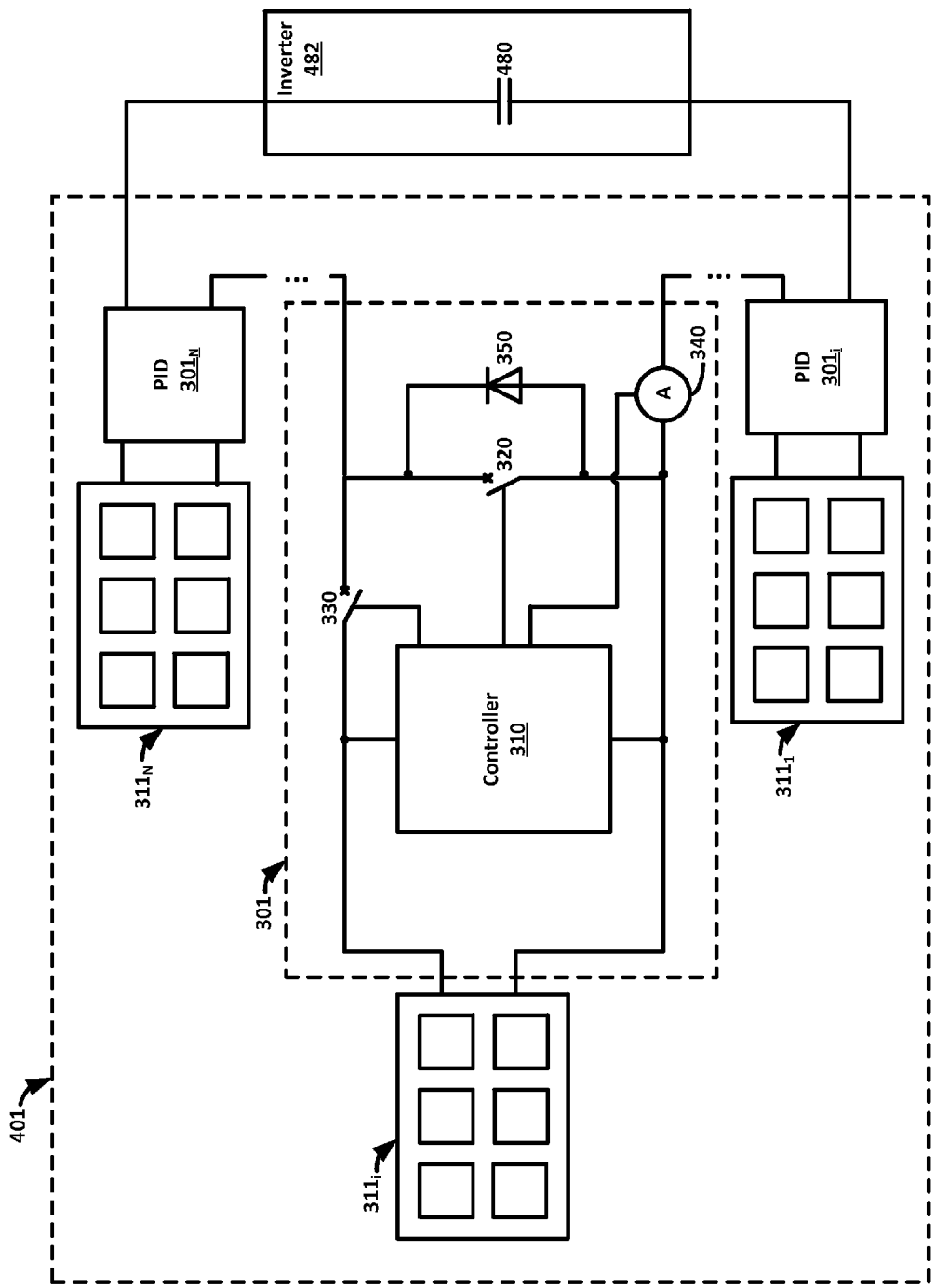
FIG. 4A is a block diagram of an embodiment of a panel string according to an embodiment herein.

FIG. 4A, with reference to FIGS. 1A through 3B, is a block diagram of a PV panel string 401 operatively connected to an inverter 482 according to an embodiment herein. Inverter 482 comprises capacitor 480 which represents the input capacitance of the inverter 482. The remaining inverter components have not been shown for clarity. String 401 comprises PV panels $311_1, \ldots 311_N$ and PIDs $301_1, \ldots 301_N$. PIDs $301_1, \ldots 301_N$ are connected in series.

When PID $301_i$ (where i can be in the range for 1 to N) reconnects its illuminated PV panel $311_i$ to the string 401 by closing switch 330 and opening switch 320, a positive current will flow as inverter capacitor 480 is charged by the illuminated PV panel $311_i$ so long as there is string continuity. Capacitor 480 will incrementally charge by the output voltage of PV panel $311_i$.

Furthermore, the charged inverter input capacitor 480 can be usefully employed to monitor string continuity. In one embodiment of a string continuity monitoring method, after capacitor 480 is incrementally charged by an amount equal to the output voltage of panel $311_i$ by a reconnect operation, controller 310 opens switch 330 and closes switch 320. So long as there is string continuity, capacitor 480 will discharge through closed switch 320 and the remaining PV panels $311_1, \ldots 311_N$ in the string 401, thereby causing a negative string current. The negative current is sensed by controller 310 through current sensor 340. A negative current amplitude above a predetermined threshold value verifies string continuity and that it is still safe to have PV panel $311_i$ remain connected to the string 401. In one embodiment a negative current amplitude threshold value of approximately −300 mA is used. Controller 310 then opens switch 320 and closes switch 330 to maintain the connection of PV panel $311_i$ to string 401. This also recharges capacitor 480. In one embodiment, controller 310 opens switch 330 and toggles switch 320 open and closed to control the rise in negative string current and prevents the string current from rising faster than the response time of PID 301. In one embodiment the switch is toggled open and closed for approximately 10 mS with a frequency of 100 kHz.

Figure 4B:
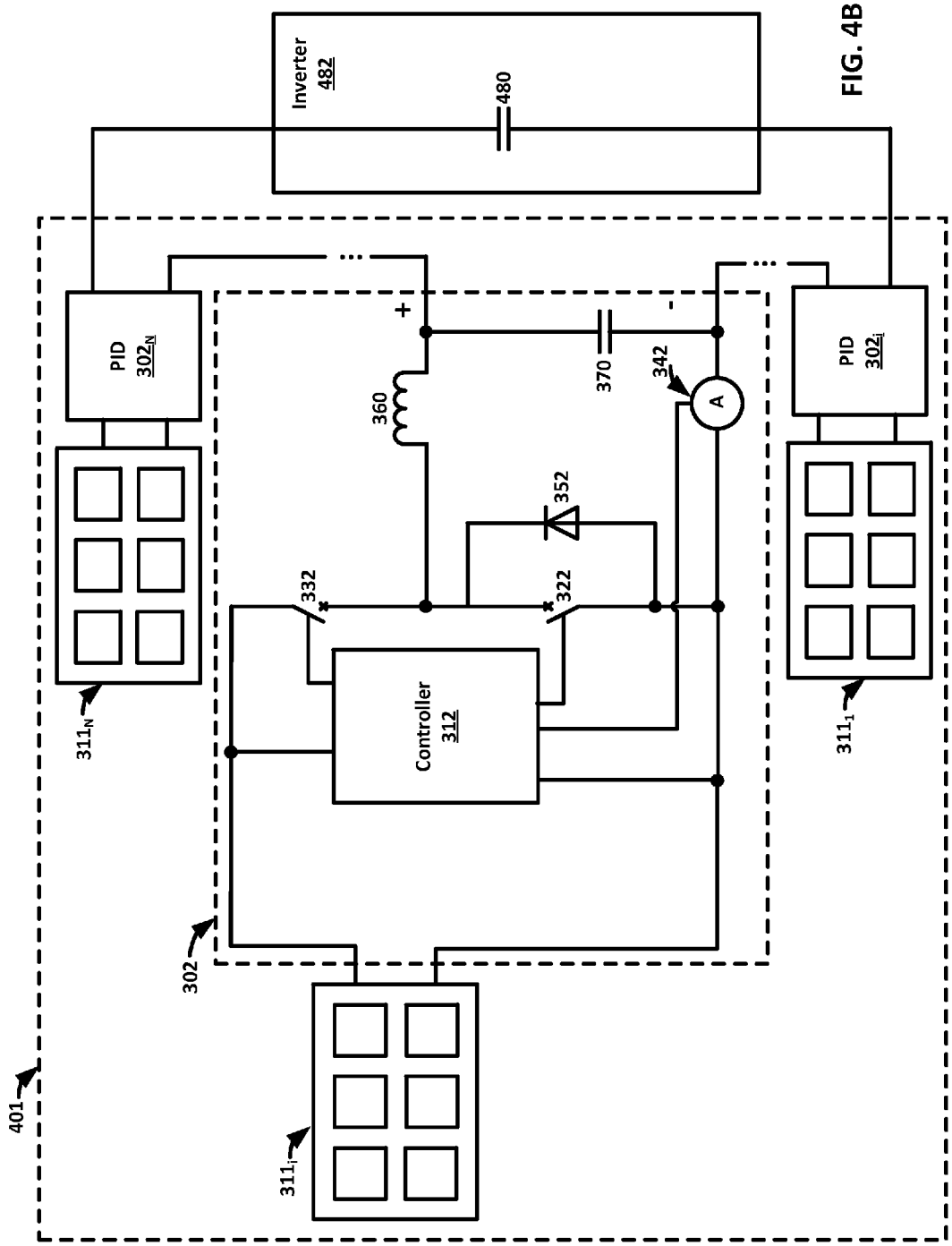
FIG. 4B is a block diagram of another embodiment of a panel string according to an embodiment herein.

FIG. 4B, with reference to FIGS. 1A through 4A, is a another block diagram of a PV panel string 401 operatively connected to an input of an inverter 482 according to an embodiment herein. Inverter 482 comprises capacitor 480 which represents the input capacitance of the inverter 482. The remaining inverter components have not been shown for clarity. String 401 comprises PV panels $311_1, \ldots 311_N$ and PIDs $302_1, \ldots 302_N$. PIDs $302_1, \ldots 302_N$ are connected in series.

When PID 302$_i$ (where i can be in the range for 1 to N) reconnects its respective illuminated PV panel $311_i$ to the string 401, the capacitor 480 will incrementally charge by an amount $V_{OUT}$, which is the output voltage of PID $302_i$. In one embodiment, $V_{OUT}$ is the open circuit voltage of PV panel $311_i$.

In an embodiment of a string continuity monitoring method, after capacitor 480 is charged by a reconnect operation, controller 312 opens switch 332 and toggles switch 322 open and closed. In one embodiment the toggle frequency is in the range of 100 kHz and switch 322 is toggled for a duration of 10 mS. So long as there is string continuity, capacitor 480 will discharge through switch 320 and the remaining PV panels $311_1, \ldots 311_N$ in the string 401 causing a negative string current. In one embodiment the width of the toggle "ON" pulse is varied to control the rise in string current and prevent it rising faster than the PID's response. The negative current is sensed by controller 312 through current sensor 342. A negative current amplitude above a predetermined threshold value verifies string continuity and that it is still safe to have panel $311_i$ remain connected to the string 401. In one embodiment, a negative current amplitude threshold value of approximately −300 mA is used. PID 302 then resumes outputting voltage $V_{OUT}$ to the string 401 to maintain the connection of PV panel $311_i$ to string 401. This also recharges capacitor 480. Diode 352 allows string current to flow in the event that PV panel $311_i$ cannot supply sufficient power to operate controller 312.

Figure 5:
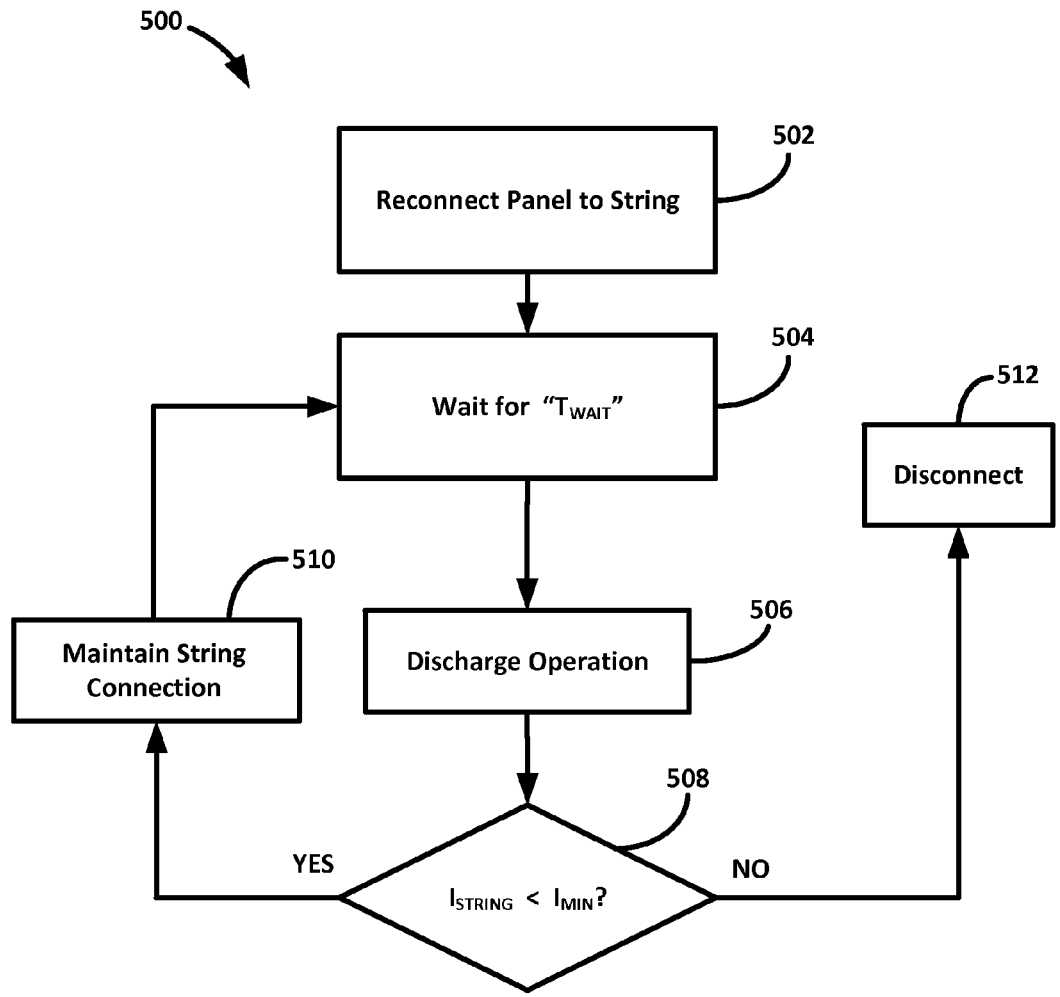
FIG. 5 is a flow diagram of an example reconnect operation according to an embodiment herein.

FIG. 5, with reference to FIGS. 1 through 4B, is a flowchart illustrating an exemplary string continuity monitoring method 500 for a string of PID enabled PV panels (e.g., PV panels $311_1, \ldots 311_N$) according to an embodiment herein. At step 502, the PV panel (e.g., PV panel $311_i$) is reconnected to the string (e.g., string 401) by a reconnect operation. At step 504, there is a waiting period of length $T_{WAIT}$. $T_{WAIT}$ could be any suitable period of time. In one example, the waiting period $T_{WAIT}$ could be in the range of approximately 1 to 10 seconds. However, the embodiments herein are not restricted to a particular waiting period or range. After the waiting period expires, a PID discharge operation is performed at step 506 whereby the PID (e.g., PID $302_i$) attempts to discharge the input capacitance of the string inverter (e.g., inverter 482). The discharge operation could include a temporary disconnection of the PV panel (e.g., PV panel $311_i$) from the string (e.g., string 401) while checking for negative current as described next, however it is not considered to be permanently "disconnected state". At step 508, the string current ($I_{STRING}$) is measured and compared to a negative current threshold value $I_{MIN}$. In one example embodiment, $I_{MIN}$ is approximately −300 mA. However, the embodiments herein are not restricted to a particular threshold value or range of values. If $I_{STRING}$ is less than $I_{MIN}$ (Yes) as detected by a sensor (e.g., current sensor 342), then continuity of the string (e.g., string 401) is confirmed and the panel connection to the string is maintained at step 510. A discharge current is conventionally negative in this method. If however in step 508 $I_{STRING}$ is greater than or equal to $I_{MIN}$ (No), then continuity of the string (e.g., string 401) is not confirmed and the PV panel (e.g., PV panel $311_i$) is disconnected from the string (e.g., string 401) at step 512 and enters a "disconnected state" until the continuity of the string (e.g., string 401) can be confirmed in a subsequent process.

Although not shown in FIG. 5 a separate check for a positive DC string current could be simultaneously running during method 500. If a positive DC string current is detected by a sensor (e.g., current sensor 342) it could indicate that the inverter (e.g., inverter 482) has/had started and could cause method 500 to terminate.

Although not shown in FIG. 5 a separate check for a negative DC string current could be continuously running during wait operation 504. A negative current could be produced by the discharge operation of another PID $311_j$ (where j≠i) on string 401, for example. If a negative current is detected during wait operation 504, then the PV panel (e.g. PV panel $311_i$) connection could immediately be maintained at step 510.

Figure 6:
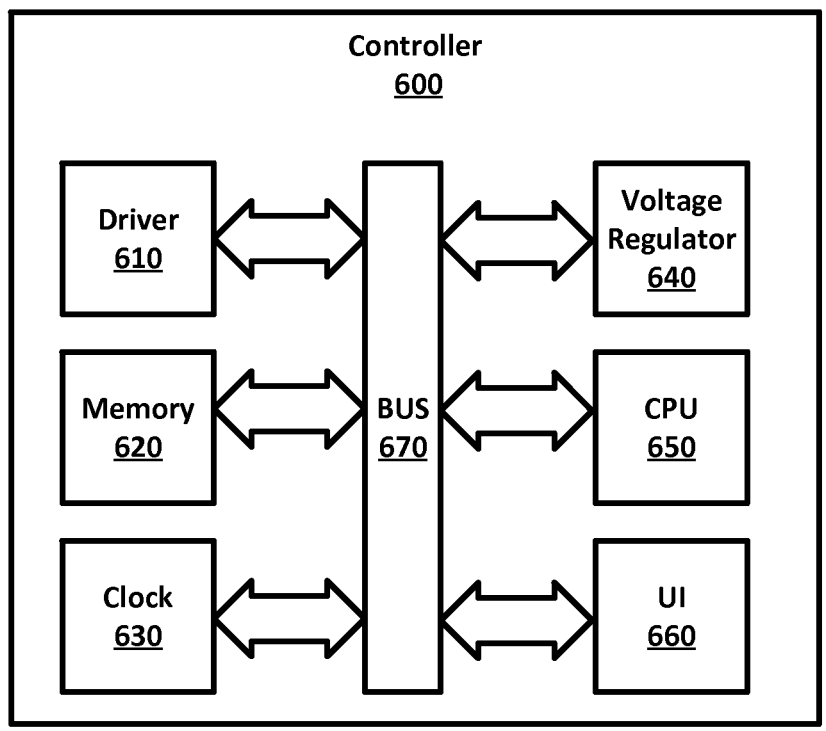
FIG. 6 is a block diagram of an embodiment of a controller according to an embodiment herein.

FIG. 6, with reference to FIGS. 1A through 5, is a block diagram of one embodiment of a PID controller 600 according to an embodiment herein. Controller 600 could be used for controller 310, 312 in accordance with the embodiments herein. Controller 600 comprises driver 610, memory 620, clock 630, voltage regulator 640, central processing unit (CPU) 650, user interface (UI) 660, and control and data bus 670. Voltage regulator 640 converts the variable PV panel output voltage to a constant controller supply voltage in an embodiment. Driver 610 supplies switch drive signals to switches 320, 330, 322, 332 to control their respective opening and closing and toggling. Firmware for the operation of the controller 600 is stored in memory 620. In one embodiment, memory 620 comprises non-volatile memory such as Flash, Electrically Erasable Programmable Read Only Memory (EEPROM), EPROM, ROM, etc. The firmware is executed on CPU 650. Clock 630 controls the internal timing of the operation of the controller 600. UI 660 indicates the status of a PID to a user. Control and data bus 670 interconnects these components of the controller 600 with each other as shown, in one embodiment herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. For example, it should also be appreciated that the embodiments disclosed herein are not necessarily restricted to single PV panel string implementations. Accordingly, multiple PV panel strings could be connected in parallel to the same inverter, as shown in FIG. 2B. Moreover, it is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of monitoring a photovoltaic (PV) installation, said method comprising:

providing at least one PV panel reconnected to a power system after a previous disconnection, wherein said power system does not draw current from said at least one PV panel;

determining whether a maintain connection condition is satisfied to maintain connection of said at least one PV panel to said power system; and controlling said connection of said at least one PV panel to said power system based on whether said maintain connection condition is satisfied.

2. The method of claim 1, wherein said controlling said connection of said at least one PV panel to said power system comprises automatically resuming said connection of said at least one PV panel to said power system responsive to determining that said maintain connection condition is satisfied.

3. The method of claim 1, wherein said controlling said connection of said at least one PV panel to said power system comprises automatically disconnecting said at least one PV panel from said power system responsive to determining that said maintain connection condition is not satisfied.

4. The method of claim 1, wherein said maintain connection condition comprises determining whether there is a minimum magnitude of a negative current in said power system.

5. The method of claim 4, wherein said negative current comprises a discharge current of an inverter input capacitance, and wherein the determining whether said maintain connection condition is satisfied comprises determining whether there is at least a minimum magnitude of current flow in said power system.

6. The method of claim 4, further comprising toggling at least one switch that is operatively connected to said at least one PV panel to control an amplitude of said negative current.

7. The method of claim 1, further comprising:
providing a string of PV panels; and
using a panel interface device (PID) to operatively disconnect said at least one PV panel from said string.

8. A method of monitoring a photovoltaic (PV) installation, said method comprising:
providing a string of multiple panel interface device (PID) enabled PV panels;
operatively connecting an inverter to the string;
operatively connecting at least one PV panel to said string;
discharging an input capacitance of said inverter;
comparing a current in said string to a predetermined current threshold value; and
controlling connection of said at least one PV panel to said string based on the comparing of said current in said string to said predetermined current threshold value.

9. The method of claim 8, further comprising using a PID to discharge said input capacitance of said inverter.

10. The method of claim 8, further comprising waiting for a predetermined period of time prior to said discharging of said input capacitance.

11. The method of claim 10, further comprising checking for a negative DC current in said string during the waiting process.

12. The method of claim 11, further comprising immediately maintaining connection of said at least one PV panel to said string when said negative DC current in said string is detected during said waiting process.

13. The method of claim 8, further comprising maintaining connection of said at least one PV panel to said string when said current in said string is less than said predetermined current threshold value.

14. The method of claim 8, further comprising disconnecting said at least one PV panel to said string when said current in said string is greater than or equal to said predetermined current threshold value.

15. The method of claim 8, further comprising toggling at least one switch that is operatively connected to said at least one PV panel to control a rise of said current.

16. A photovoltaic (PV) system comprising:
at least one PV panel;
a power system operatively connected to said at least one PV panel, wherein said power system does not draw current from said at least one PV panel;
at least one switch that controls maintaining connection of said at least one PV panel to said power system; and
a controller operatively connected to said at least one switch, wherein said controller:
determines whether a maintain connection condition is satisfied to maintain connection of said at least one PV panel to a power system, and
supplies switch drive signals to said at least one switch for said maintaining connection of said at least one PV panel to said power system based on whether said maintain connection condition is satisfied.

17. The PV system of claim 16, wherein said controller supplies said switch drive signals to said at least one switch to automatically resume said connection of said at least one PV panel to said power system responsive to determining that said maintain connection condition is satisfied.

18. The PV system of claim 16, wherein said controller supplies said switch drive signals to said at least one switch to automatically disconnect said at least one PV panel from said power system responsive to determining that said maintain connection condition is not satisfied.

19. The PV system of claim 16, further comprising a current sensor operatively connected to said controller, wherein said maintain connection condition comprises using said current sensor to determine whether there is a minimum magnitude of a negative current in said power system.

20. The PV system of claim 19, further comprising:
a panel interface device (PID) operatively connected to said at least one PV panel; and
an inverter operatively connected to said PID,
wherein said negative current comprises a discharge current of an input capacitance of said inverter, and
wherein said current sensor determines whether there is at least a minimum magnitude of current flow in said power system.

21. The PV system of claim 19, wherein said controller toggles said at least one switch to control an amplitude of said negative current.

* * * * *